(12) United States Patent
Moldenhauer

(10) Patent No.: US 8,100,019 B2
(45) Date of Patent: Jan. 24, 2012

(54) CARTRIDGE FLUID TRANSDUCER

(75) Inventor: Daniel Ervin Moldenhauer, Milwaukee, WI (US)

(73) Assignee: MKT Engineering, LLC, Milwaukee, WI (US)

( * ) Notice: Subject to any disclaimer, the term of this patent is extended or adjusted under 35 U.S.C. 154(b) by 175 days.

(21) Appl. No.: 12/755,509

(22) Filed: Apr. 7, 2010

(65) Prior Publication Data
US 2011/0247425 A1 Oct. 13, 2011

(51) Int. Cl.
*G01L 9/06* (2006.01)
(52) U.S. Cl. .......................... 73/721; 73/727; 73/861.58
(58) Field of Classification Search .................. None
See application file for complete search history.

(56) References Cited

U.S. PATENT DOCUMENTS

| | | | | |
|---|---|---|---|---|
| 3,221,281 A | * | 11/1965 | Roeger | 336/30 |
| 3,553,501 A | * | 1/1971 | Thill | 310/327 |
| 3,617,065 A | * | 11/1971 | Camras | 360/93 |
| 3,816,671 A | * | 6/1974 | Fraim et al. | 381/114 |
| 4,043,044 A | * | 8/1977 | Whitehead et al. | 33/552 |
| 5,877,411 A | | 3/1999 | Namerikawa et al. | |
| 6,640,639 B2 | | 11/2003 | Okawa | |
| 6,883,377 B2 | | 4/2005 | Doubrovsky | |
| 7,325,463 B2 | | 2/2008 | Morrison et al. | |
| 7,327,273 B2 | | 2/2008 | Hung et al. | |
| 7,458,271 B2 | | 12/2008 | Mutz | |
| 7,525,093 B2 | | 4/2009 | Stenberg | |
| 2011/0247431 A1 | * | 10/2011 | Moldenhauer | 73/861.58 |

* cited by examiner

*Primary Examiner* — Andre Allen
(74) *Attorney, Agent, or Firm* — Reinhart Boerner Van Deuren s.c.

(57) ABSTRACT

There is provided a fluid transducer. The transducer housing includes a nose section, a middle section, and a rear section, with the nose section defining a through bore. A sensor is disposed in the nose section and is in fluid communication with the through bore. An electronic module is disposed in the middle section and is in electrical communication with the sensor. A cap is coupled to the real section of the transducer housing, with the cap configured to seal the rear section of the transducer housing. A conductor-insulator assembly is coupled to an outer surface of the transducer housing and the conductor of the conductor-insulator assembly is coupled to the electronic module. In one embodiment the conductor-insulator assembly is annular in shape, with an inside diameter corresponding to the outer surface of the transducer housing.

50 Claims, 11 Drawing Sheets

CARTRIDGE FLUID TRANSDUCER

BACKGROUND OF THE INVENTION

Field of the Invention

The present invention relates generally to transducers, and more particularly to a cartridge fluid transducer configured for disposition in a fluid system component.

A transducer is a device that accepts an inputted energy in one form and produces an output of energy in some other form, with a known, fixed relationship between the input and the output. For example, a thermalcouple converts heat energy into electrical energy with a fixed relationship relative to temperature. Another type of transducer converts fluid pressure energy into electrical energy in a fixed relationship to determine the pressure in a system to which the transducer is exposed.

One type of transducer typically is located spatially external to a host device from which the transducer is obtaining a signal. In such configuration, the transducer is exposed to the environment in which the host device is exposed with possible resulting damage from impacts, moisture, heat, etc. Such exposure of an externally positioned transducer can shorten its useful life thereby adding costs to the user of such transducer.

Another type of transducer is spacially configured integrally with a device. Such configuration eliminates the problems of the external mounted transducer however if the transducer experiences a malfunction, the entire device including the transducer has to be replaced. Such arrangement can be very expensive and typically the device is more expensive than the transducer which is contained in the device.

The cartridge fluid transducer of the present disclosure avoids the various circumstances of an externally mounted transducer or an integrally contained transducer described above.

The cartridge fluid transducer of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

SUMMARY

The disadvantages and limitations of the background art discussed above are overcome by the present invention. With this invention, there is provided a fluid transducer. The fluid transducer includes a transducer housing defining an interior cavity. The transducer housing includes a nose section, a middle section, and a rear section, with the nose section defining a through bore. A sensor is disposed in the nose section and is in fluid communication with the through bore. An electronic module is disposed in the middle section and is in electrical communication with the sensor. A cap is coupled to the rear section of the transducer housing, with the cap configured to seal the rear section of the transducer housing. A conductor-insulator assembly is coupled to an outer surface of the transducer housing and the conductor of the conductor-insulator assembly is coupled to the electronic module. In one embodiment the conductor-insulator assembly is annular in shape, with an inside diameter corresponding to the outer surface of the transducer housing. In another embodiment there is provided a second conductor-insulator assembly, with the outer diameter of the second conductor-insulator assembly configured to be less than the outer diameter of the first conductor-insulator assembly. The fluid transducer may also be provided with a data port defined in the cap, with the data port in electric communication with the electronic module, wherein data is transmitted to and from the electronic module and wherein the electronic module is reconfigurable through the data port.

There is also provided a fluid system component that includes a component body defining an inlet port and an outlet port. The component body defines a conduit between the inlet and outlet ports and a transducer orifice defined in the component body with the transducer orifice in fluid communication with the conduit. The fluid transducer is configured for installation in the transducer orifice. The fluid transducer includes a transducer housing defining an interior cavity. The transducer housing includes a nose section, middle section, and a rear section, with the nose section defining a through bore. A sensor is disposed in the nose section and is in fluid communication with the through bore. An electronic module is disposed in the middle section and is in electric communication with the sensor. A cap is coupled to the rear section of the transducer housing, with the cap configured to seal the rear section of the transducer housing. A conductor-insulator assembly is coupled to the outer surface of the transducer housing and coupled to the electronic module. The through bore is in fluid communication with the transducer orifice and when the fluid transducer is disposed in the transducer orifice of the component body, only the cap is exposed outside of the component body.

There is further disclosed a fluid system component including a component body and a fluid transducer. The component body includes an inlet port and an outlet port, with the component body defining a conduit between the inlet and outlet ports. A transducer orifice is defined in the component body and is in fluid communication with the conduit. The fluid transducer is configured for installation in the transducer orifice. The fluid transducer includes a transducer housing defining an interior cavity, with the transducer housing including a nose section, a middle section, and a rear section, with the nose section defining a through bore. A sensor is disposed in the nose section and is in fluid communication with the through bore. An electric module is disposed in the middle section and is in electric communication with the sensor. A cap is coupled to the rear section of the transducer housing, with the cap configured to seal the rear section of the transducer housing. A conductor-insulator assembly is coupled to an outer surface of the transducer housing and is coupled to the electric module. The component body also defines an electronic module cavity including a raceway in communication with the transducer orifice. A component electronic module is disposed in the electronic module cavity and is coupled to the conductor-insulator assembly with a conductor through the raceway. The through bore is in fluid communication with the transducer orifice and when the fluid transducer is disposed in the transducer orifice of the component body, only the cap is exposed outside of the component body.

There is further provided a fluid system component including a component body and a fluid transducer. The component body defines a transducer orifice and a single fluid port. The transducer orifice is in fluid communication with the single fluid port. The fluid transducer is configured for installation in the transducer orifice. The fluid transducer includes a transducer housing defining an interior cavity and includes a nose section, middle section, and a rear section, with the nose section defining a through bore. A sensor is disposed in the nose section and is in fluid communication with the through bore. An electronic module is disposed in the middle section of the transducer housing and is in electric communication with the sensor. A cap is coupled to the rear section of the transducer housing, with the cap configured to seal the rear section of the transducer housing. The cap may be provided with a data port with the data port in electric communication with the electronic module, wherein the data is transmitted to and from the electronic module and wherein the electronic module is reconfigurable through the data port. A conductor-insulator assembly is coupled to an outer surface of the transducer housing and coupled to the electronic module, wherein the through bore is in fluid communication with the transducer orifice, and only the cap is exposed outside of the component body when the fluid transducer is disposed in the transducer orifice of the component body.

There is also provided a method to measure a characteristic of the fluid in the fluid system. The fluid system includes a fluid component defining a port configured to couple to the fluid system. The fluid component further defines an orifice with the orifice in fluid communication with the port. The method includes the steps of providing a fluid transducer configured for installation in the orifice. The fluid transducer includes a transducer housing defining an interior cavity, with the transducer housing including a nose section, a middle section, and a rear section, with the nose section defining a through bore. A sensor is disposed in the nose section and is in fluid communication with the through bore. An electronic module is disposed in the middle section and is in electronic communication with the sensor. A cap is coupled to the rear section of the transducer housing, with the cap configured to seal the rear section of the transducer housing. A conductor-insulator assembly is coupled to an outer surface of the transducer housing and is coupled to the electronic module, wherein the through bore is in fluid communication with the orifice. The method also includes installing the fluid transducer in the orifice, wherein only the cap is exposed outside of the fluid component and wherein the fluid transducer is in fluid communication with the fluid through the through bore. Coupling the fluid transducer to a controller allows the controller to obtain a signal from the sensor which is configured to provide a preselected characteristic of the fluid. Transmitting the signal to the controller wherein the characteristic of the fluid is manifested and displayed.

The apparatus of the present disclosure is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE EXEMPLARY EMBODIMENTS

Figure 1:
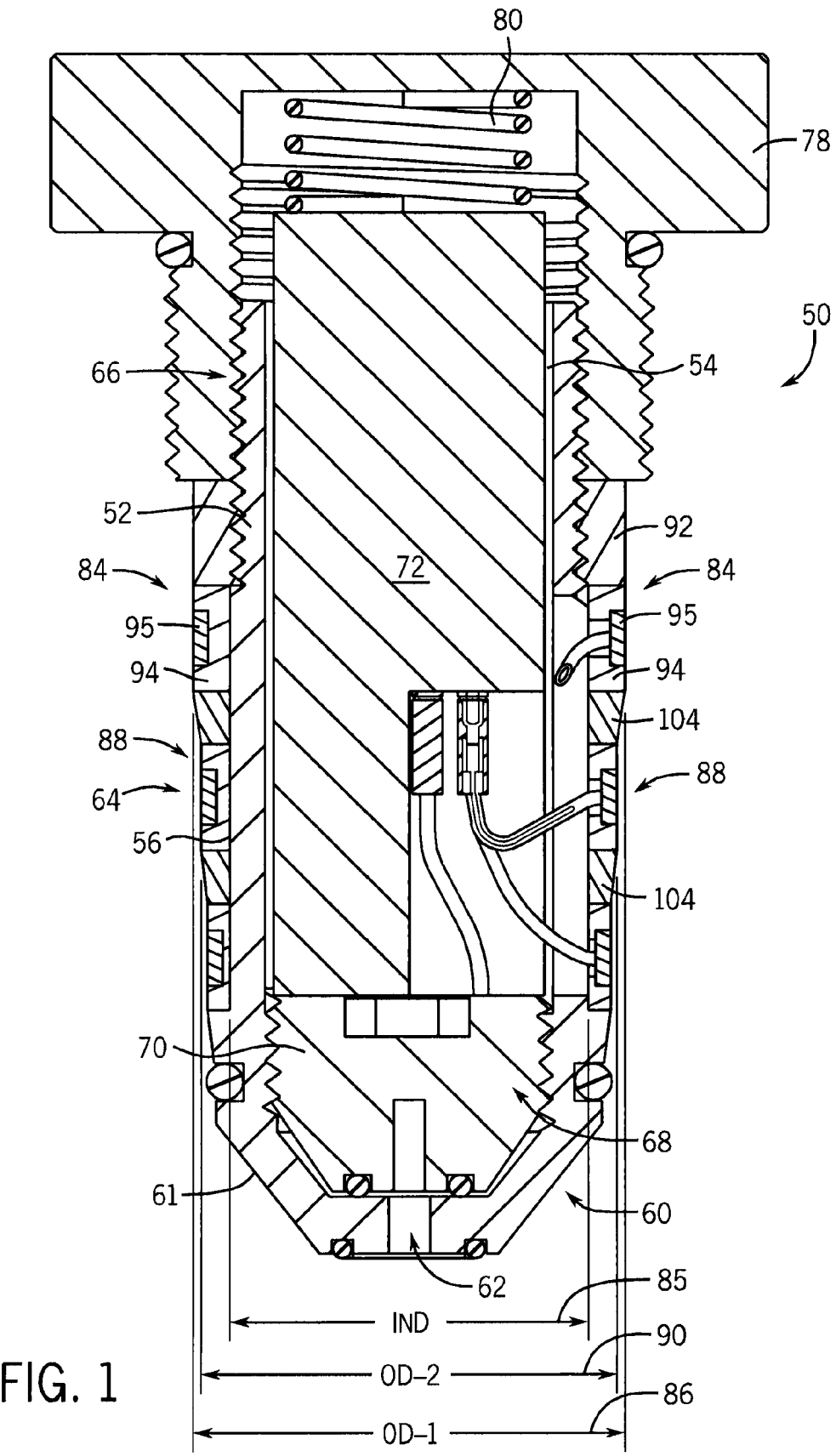
FIG. 1 is a cross-section illustration of an exemplary embodiment of a fluid transducer including a sensor coupled to an electronic module.

FIG. 1 illustrates a cross-section of an exemplary embodiment of a fluid transducer 50. The transducer 50 includes a transducer housing 52 which defines an interior cavity 54. The cavity 54 extends longitudinally within the transducer housing 52. The transducer housing 52 includes a nose section 60, a middle section 64, and a rear section 66. The nose section 60 also defines a through bore 62.

The transducer housing 52 is configured with threading defined on the rear section 66 of the housing. Such threading is used to secure a retainer nut 92 and a cap 78 to the transducer housing 52. The middle section 64 of the transducer housing 52 defines an outer surface 56 which extends from the threading of the rear section 66 to proximate the nose section 60 of the transducer housing 52. The nose section 60 defines a taper 61.

A sensor 68 is disposed in the nose section 60 and is in fluid communication with the through bore 62. The sensor may be secured to the interior of the transducer housing 52 by threading or other suitable fastening structure. The sensor may be for example a pressure sensor, such as a strain-gage type element, or it can be a temperature sensor, such as a thermalcouple. The sensor may include digital electronics that may be programmable to measure a characteristic of a fluid in a fluid system 20 to which the fluid transducer 50 is exposed.

Figure 2:
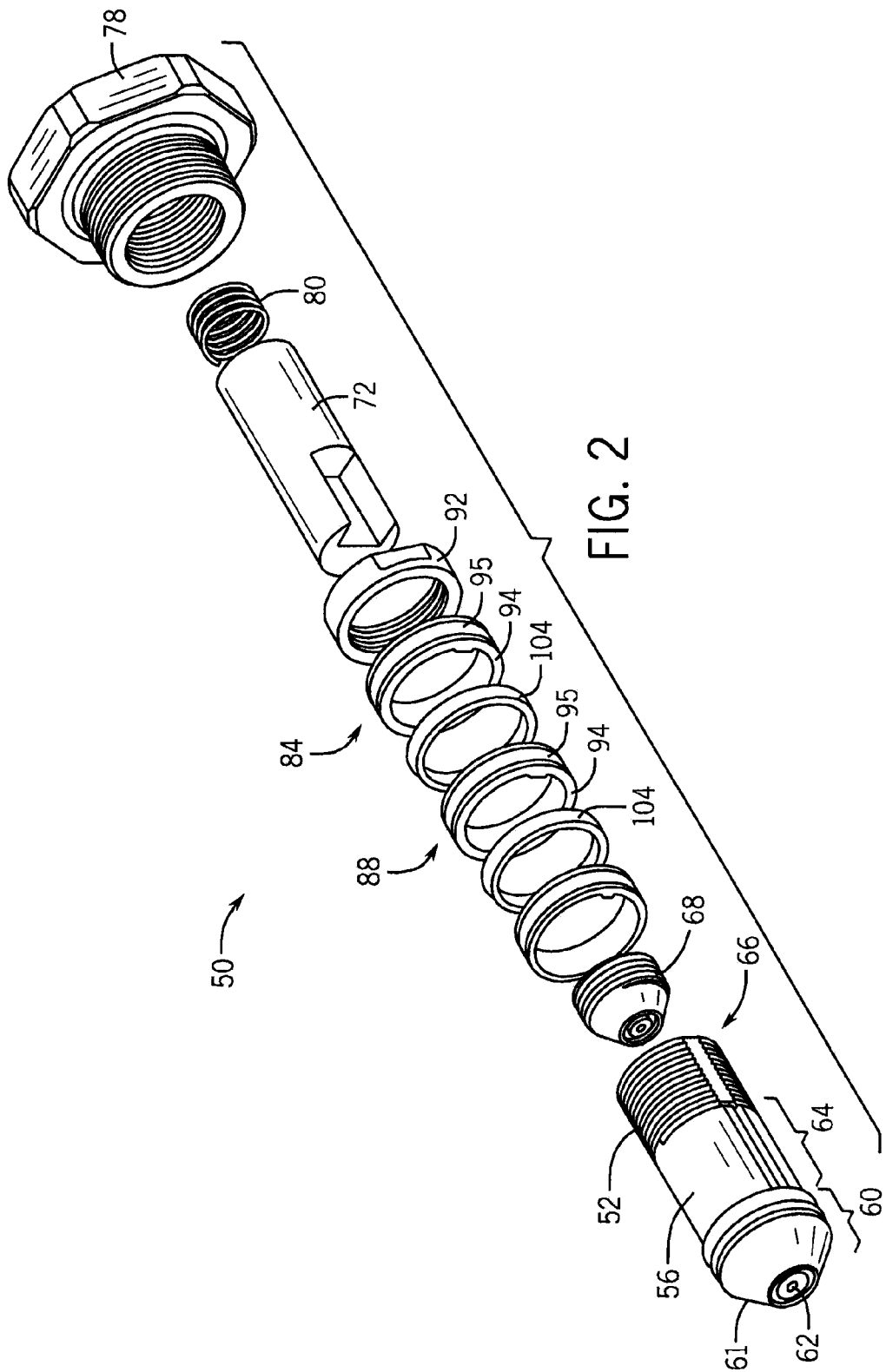
FIG. 2 is an exploded, perspective view of the fluid transducer illustrated in FIG. 1.

As illustrated in FIGS. 1 and 2, an electronic module 72 is disposed in the middle section 64 in the cavity 54 of the transducer housing 52. The electronic module 72 is in electric communication with the sensor 68. The electronic module 72 may consist of one of a differential voltage amplifier, a calibration circuit, an output driver, and digital electronics, for example a microprocessor and a Universal Serial Bus transceiver.

Figure 3A:
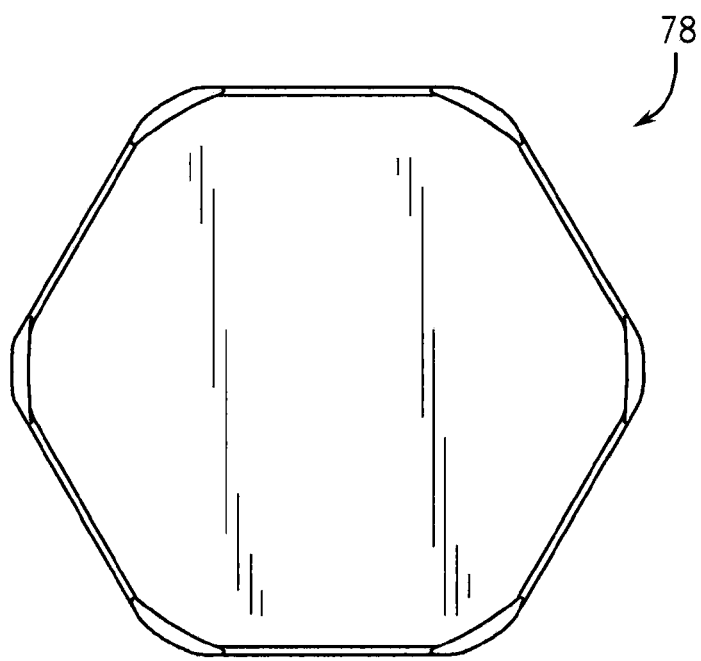
FIG. 3A is a top view of a cap of a fluid transducer, the cap defining a hexagram perimeter.
Figure 3B:
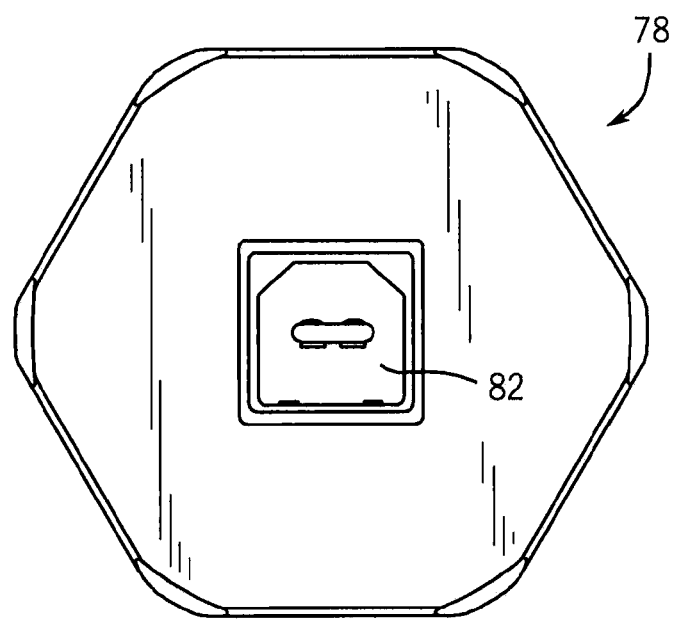
FIG. 3B is a is top view of a cap of a fluid transducer, the cap including a data port, with the illustrated data port being a Universal Serial Bus, type 'B' male receptacle.

A cap 78 is coupled to the rear section 62 of the transducer housing 52. The cap 78 is configured to seal the rear section 66 of the transducer housing 52 and is secured to the housing by appropriate threading. As illustrated in FIG. 3B the cap 78 may include a data port 82, such as a Universal Serial Bus or other appropriate connectors. The data port 82 is in electrical communication with the electronic module 72 with the data port 82 being configured to transmit data to and from the electronic module and wherein the electronic module 72 can be reconfigured through the data port as determined by a user for a specific application. A spring 80 is disposed in the cavity 54 of the transducer housing 52 between the cap 78 and the electronic module. The spring is configured to bias the electronic module 72 towards the sensor 68.

A conductor-insulator assembly 84 is coupled to the outer surface 56 of the transducer housing 52. The conductor-insulator assembly 84 includes an insulator 94 and a conductor 95. The conductor-insulator assembly 84 is annular in shape with its inside diameter 85 sized to engage the outer surface 56 of the transducer housing 52. The insulator 94 is u-shaped, in cross section, forming a channel in which the annular conductor 95 is disposed. The insulator insulates the conductor 95 from the transducer housing 52.

As illustrated in FIGS. 1 and 2, additional conductor-insulator assemblies can be installed on the transducer housing 52 with each subsequent conductor-insulator assembly having an outside diameter less than the outer diameter of the previous conductor-insulator assembly. As illustrated in FIG. 1, the conductor-insulator assembly 84 is closest to the rear section 66 of the transducer housing 52. That conductor-insulator assembly 84 has an outside diameter 86. A second conductor-insulator assembly 88 is positioned a distance from the first conductor-insulator assembly 84 by a spacer 104. The second conductor-insulator assembly 88 defines an outside diameter 90 that is less than the outside diameter 86 of the first conductor-insulator assembly 84. FIG. 1 also illustrates a third conductor-insulator assembly that is spaced from the second conductor-insulator assembly 88 by another spacer 104. The retainer nut is coupled to the transducer housing 52 and is configured to axially secure the conductor-insulator assemblies, including assemblies 84, 88, to the transducer housing 52.

It should be understood that any number of conductor-insulator assemblies can be disposed on the transducer housing as determined by a user with appropriate sizing of the insulator and conductors. All of the conductor-insulator assemblies are annular in shape, with the same inside diameter (ID) equal to the outside diameter of the transducer housing middle section 64. The stepped configuration of the various conductor-insulator assemblies provides isolation of power and signal flowing through the various conductors. The various conductors 95 in the conductor-insulator assemblies 84, 88 provide electrical connection for power and signal. As illustrated in FIG. 1, the electronic module 72 is coupled to the sensor 68 and to at least two of the conductors 95. The exemplary configuration is provided with three conductor-insulator assemblies with one assembly providing V+ and the second one providing a V− and the third providing a signal. In some circumstances, the fluid transducer 50 can be provided with a single conductor-insulator assembly and using the transducer housing itself as a conductor in the system.

As illustrated in FIG. 1, appropriate O-ring seals are provided at specific locations along the exterior of the transducer housing 52 as well as in the interior cavity 54 to fluidly seal the transducer 50 from fluid to which it is exposed. The O-rings are composed of appropriate materials that are suitable for the specific application. It is also contemplated that other types of sealing systems, such as a gel or gasket material can be used as determined by a user. It is also contemplated that the transducer housing 52, retainer nut 92 and cap 78 are composed of suitable material such as aluminum, stainless steel, and steel or combination of the same as deemed appropriate by the user for a specific application. Other materials may be used, such as engineered plastic or composite materials, configured appropriately for the intended application.

The cartridge fluid transducer 50 is configured for installation in a fluid system component 30. The fluid system component 30 typically is installed and coupled into a fluid system 20. The fluid system component 30 may be a device for measuring a characteristic of the fluid flowing in the fluid system 20 or it may be a part of a control device such as a valve.

FIGS. 4-7 illustrate variants of a fluid system component 30 which include a cartridge fluid transducer 50. The fluid system component 30 includes a component body 32 that defines an inlet port 34 and an outlet port 36 and further defining a conduit 38 between the inlet 34 and outlet 36 ports. The conduit 38 is in fluid communication with a transducer orifice 42.

The transducer orifice 42 is configured to receive a cartridge fluid transducer 50. The fluid system component 30 further defines an electronic module cavity 34 including a raceway 48 in communication with the transducer orifice 42. As illustrated in FIGS. 4-7, three raceways 48 are defined in the component body of 32. The raceways 48 provide access for wires and contacts between devices in the electronic module cavity 44 and the conductor-insulator assemblies on the transducer housing 52.

With the cartridge fluid transducer 50 installed in the transducer orifice 42 of the component body 32 only the cap 78 is exposed outside the component body 32. It is also contemplated that the transducer orifice 32 can be configured so that the cap 78 of the fluid transducer 50 is also installed in the component body 32 so that a top surface of the cap 78 is flush with the surface of the component body 32 of the fluid system component 30.

Figure 4:
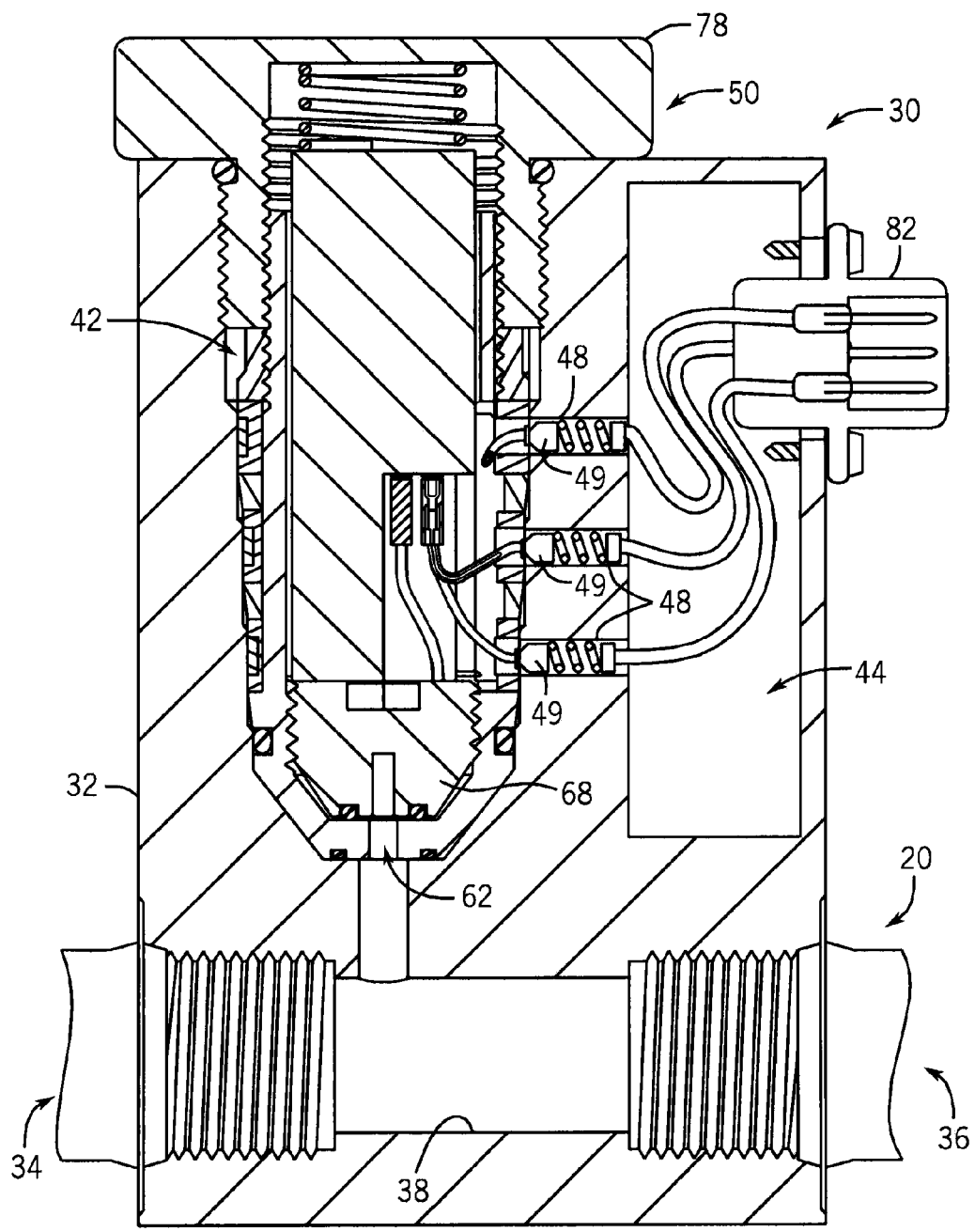
FIG. 4 is a cross-section illustration of an exemplary embodiment of a fluid system component defining an inlet and outlet ports with a conduit therebetween, the component further defining a transducer orifice configured to receive the fluid transducer illustrated in FIG. 1.

As illustrated in FIG. 4, an electrical contact 49 is in physical and electrical contact with the conductor 95 of the conductor-insulator assembly on the fluid transducer 50. The contact 49 is configured for installation in the raceway 48 defined in the component body 32 and may be biased by an appropriate spring to maintain physical contact with the conductor 95 of a conductor-insulator assembly of the fluid transducer 50. As illustrated in FIG. 4, the electrical contact 49 includes a wire coupled to a data port 82 defined in the component body 32. As further illustrated in FIG. 4, the data port 82 is coupled to the component body 32 with appropriate wiring passing through the electronic module cavity 44.

Appropriate power signals and data signals are transmitted through the data port 82 to and from the fluid transducer 50 through the conductors 95 of each of a conductor-insulator assembly mounted on the fluid transducer housing 52. A signal from the sensor 68 is transmitted to the electronic module 72 and then to the data port 82 through the conductor 95 and electrical contact 49 as described above. It should be understood that if the data port 82 is configured in the cap 78 as illustrated in FIG. 3B a data port may not be coupled to the component body 32.

Figure 5:
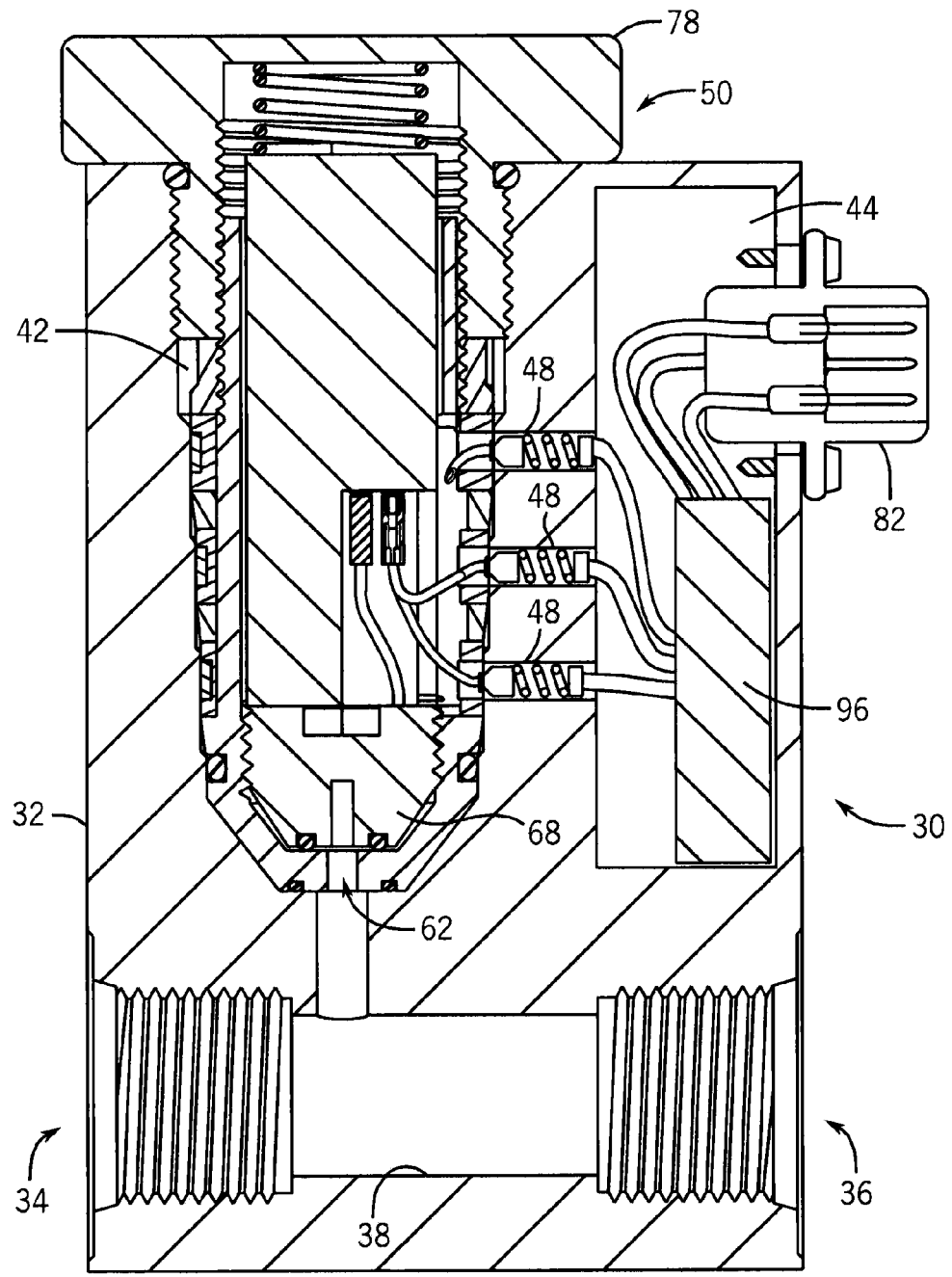
FIG. 5 is a cross-section illustration of an exemplary embodiment of a fluid system component defining an inlet and outlet ports with a conduit therebetween, the component further defining a transducer orifice configured to receive the fluid transducer illustrated in FIG. 1, and further including a component electronic module coupled to the fluid transducer.

In another variant of the fluid system component 30, a component electronic module 96 is installed in the electronic module cavity 44 (See FIG. 5). The component electronic module 96 can be a controller, for example a micro processor, and is in electrical contact with the data port 82 and the conductor 95 of each of the conductor-insulator assemblies mounted on the fluid transducer 50 through a raceway 48 defined in the component body 32.

Figure 6:
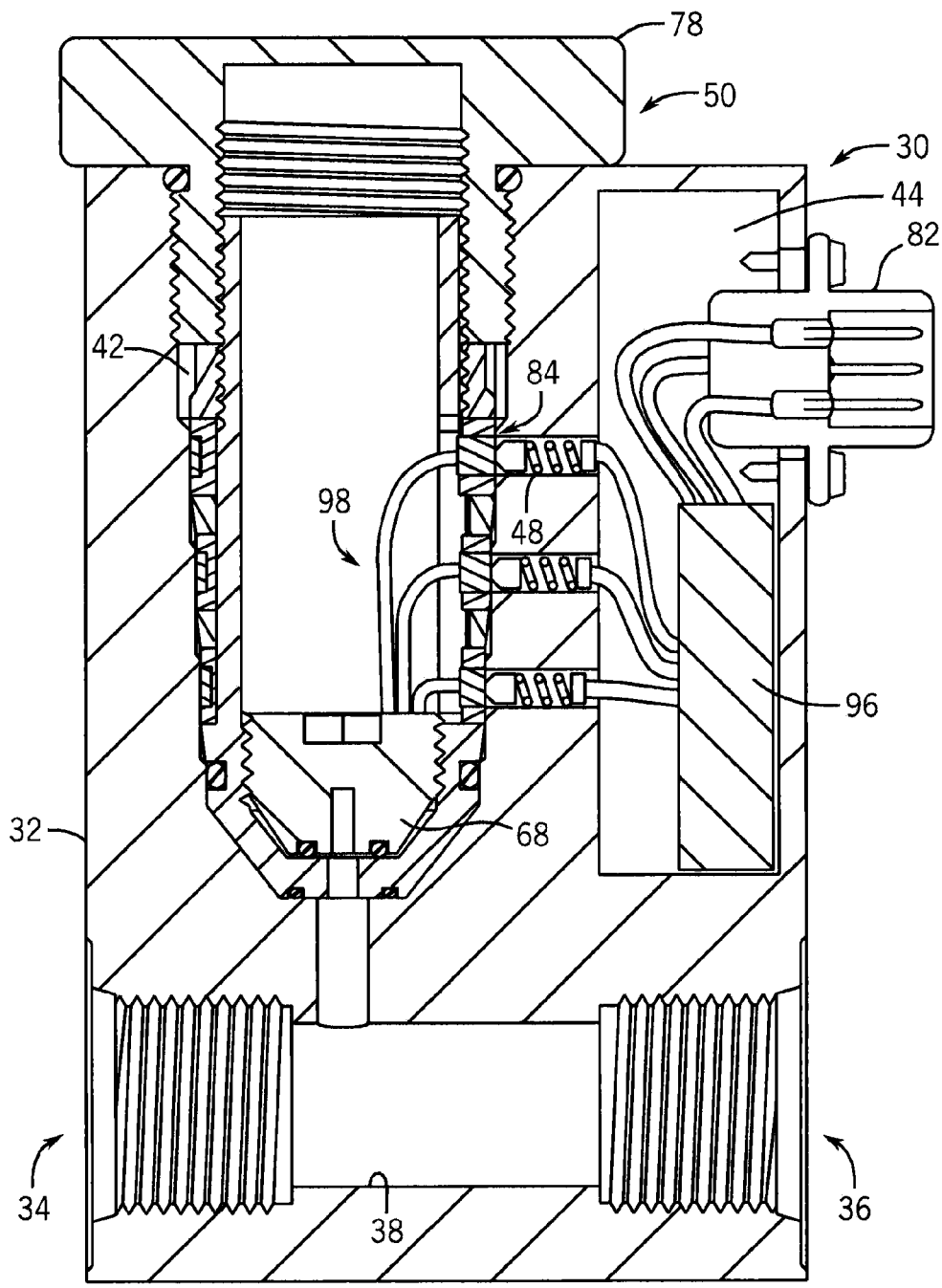
FIG. 6 is a cross-section illustration of an exemplary embodiment of a fluid system component defining an inlet and outlet ports with a conduit therebetween, the component further defining a transducer orifice configured to receive a fluid transducer, with a sensor in the fluid transducer configured to couple with an electronic module disposed in an electronic module cavity.

In another embodiment, the fluid transducer 50 contains an electric module 98 which electrically couples the sensor 68 to a controller 96 and the data port 82 (See FIG. 6). As illustrated in FIG. 6, the electric module 98 is a wiring harness composed of individual wires that transmits power and data to and from the sensor which is in fluid communication with the conduit 38 of the fluid system component 30. The electric module 98 may also be a circuit board with wire traces instead of individual wires.

Figure 7:
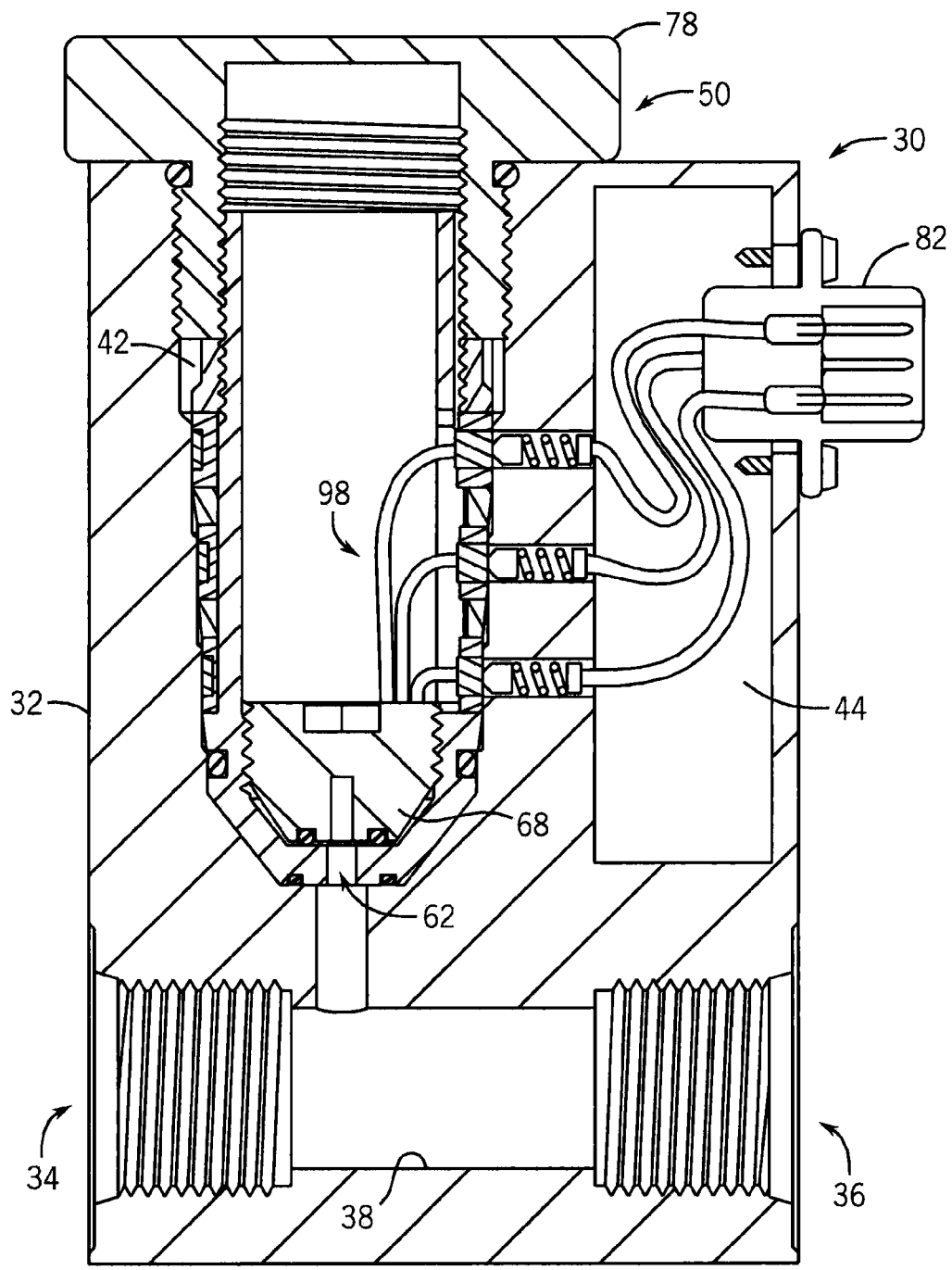
FIG. 7 is a cross-section illustration of an exemplary embodiment of a fluid system component defining an inlet and outlet ports with a conduit therebetween, the component further defining a transducer orifice configured to receive a fluid transducer, with a sensor in the fluid transducer configured to couple directly with a data port coupled to the fluid system component.
Figure 8:
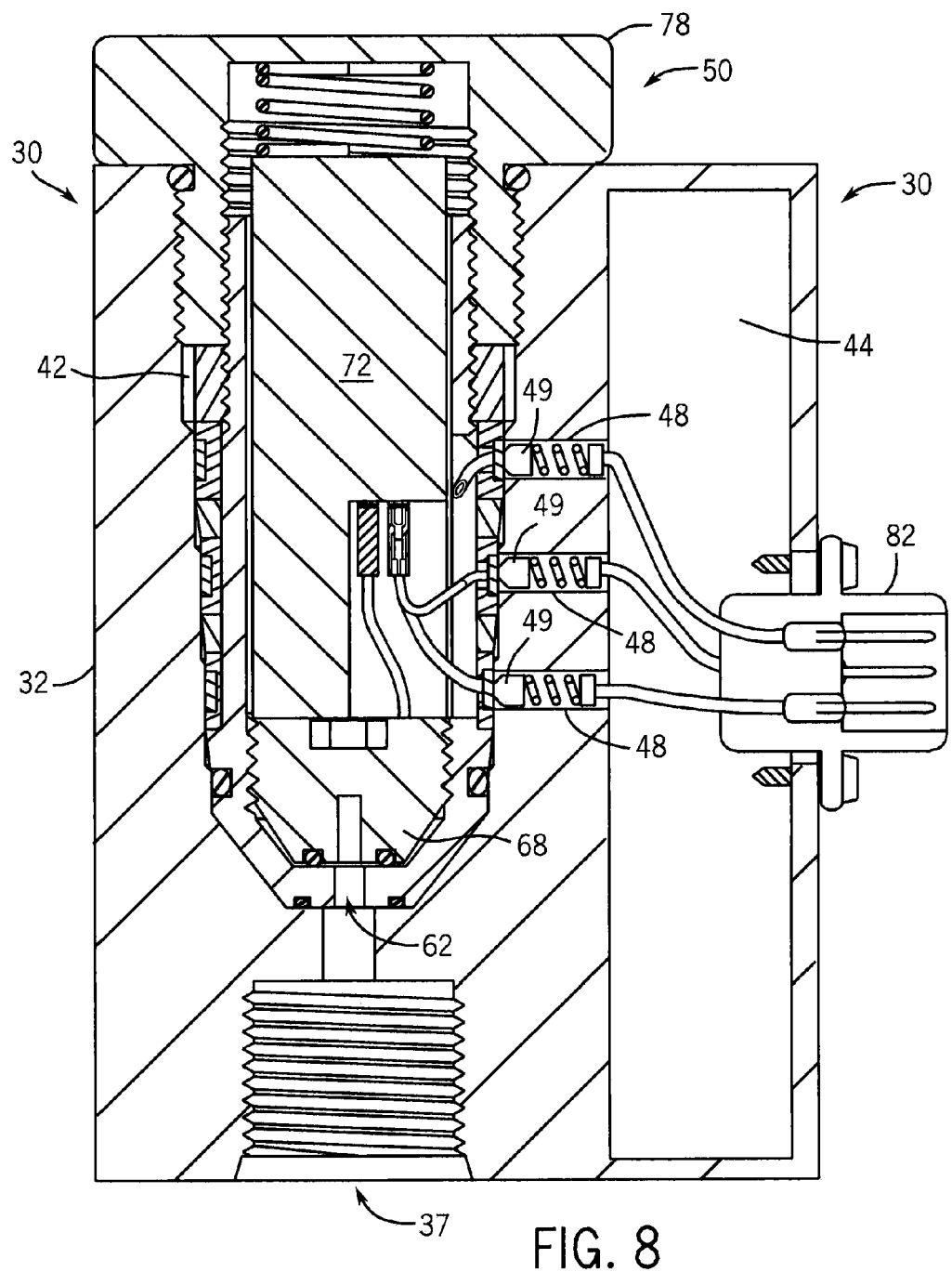
FIG. 8 is a cross-section illustration of an exemplary embodiment of a fluid system component defining a single fluid port, the component further defining a transducer orifice configured to receive the fluid transducer illustrated in FIG. 1.
Figure 9:
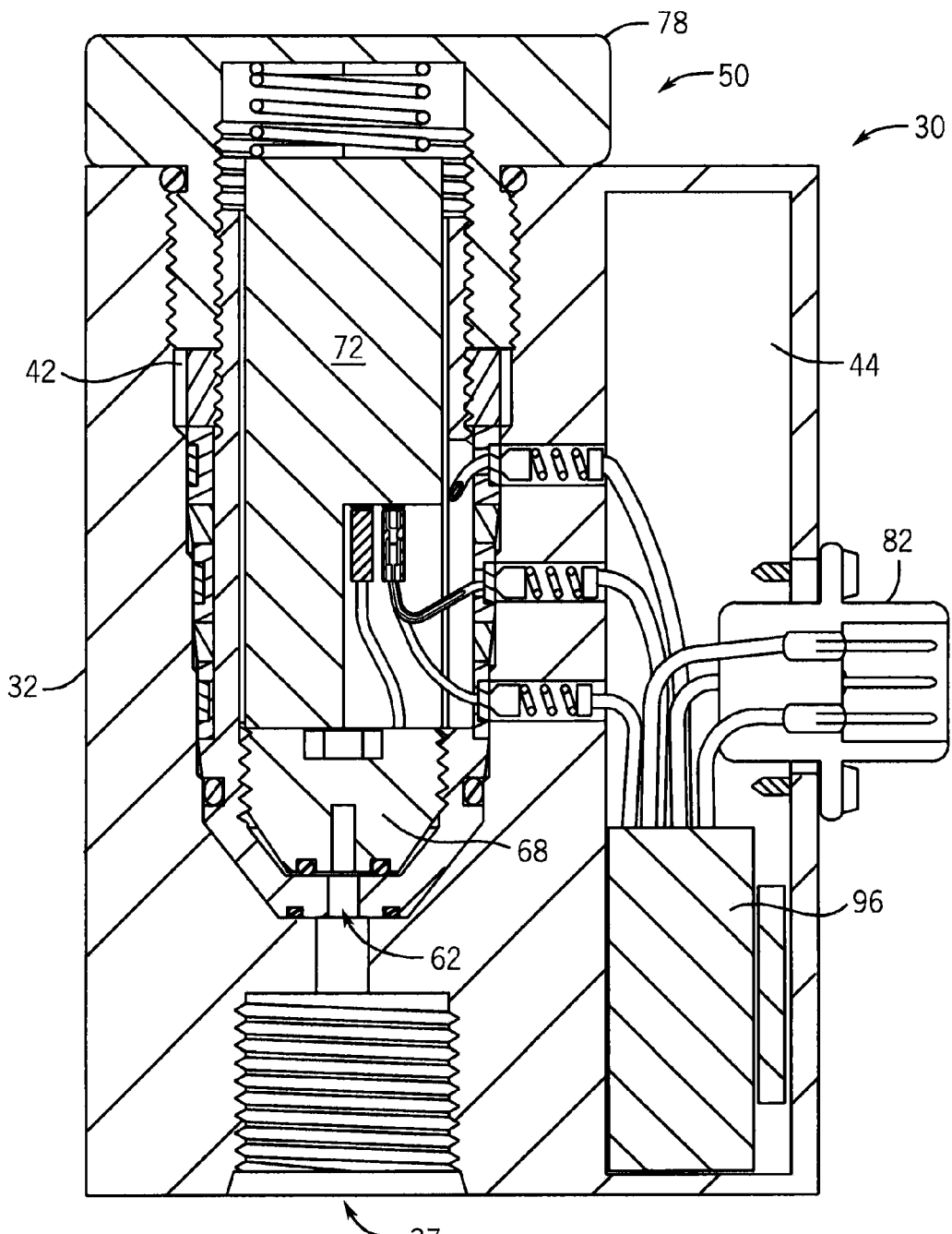
FIG. 9 is a cross-section illustration of an exemplary embodiment of a fluid system component defining a single fluid port, the component further defining a transducer orifice configured to receive the fluid transducer illustrated in FIG. 1, and further including a component electronic module coupled to the fluid transducer.
Figure 10:
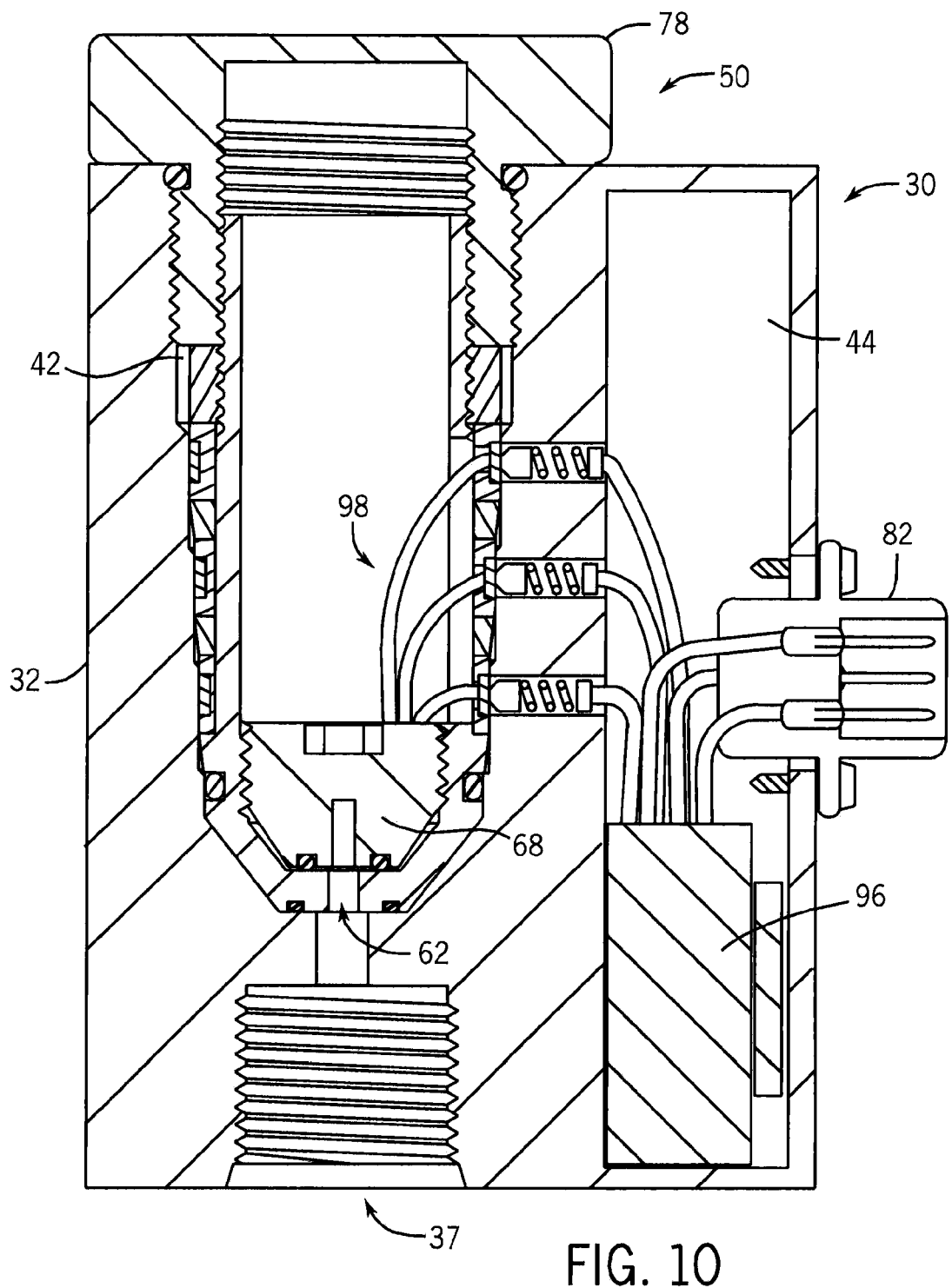
FIG. 10 is a cross-section illustration of an exemplary embodiment of a fluid system component defining a single fluid port, the component further defining a transducer orifice configured to receive a fluid transducer, with a sensor in the fluid transducer configured to couple with an electronic module disposed in an electronic module cavity.
Figure 11:
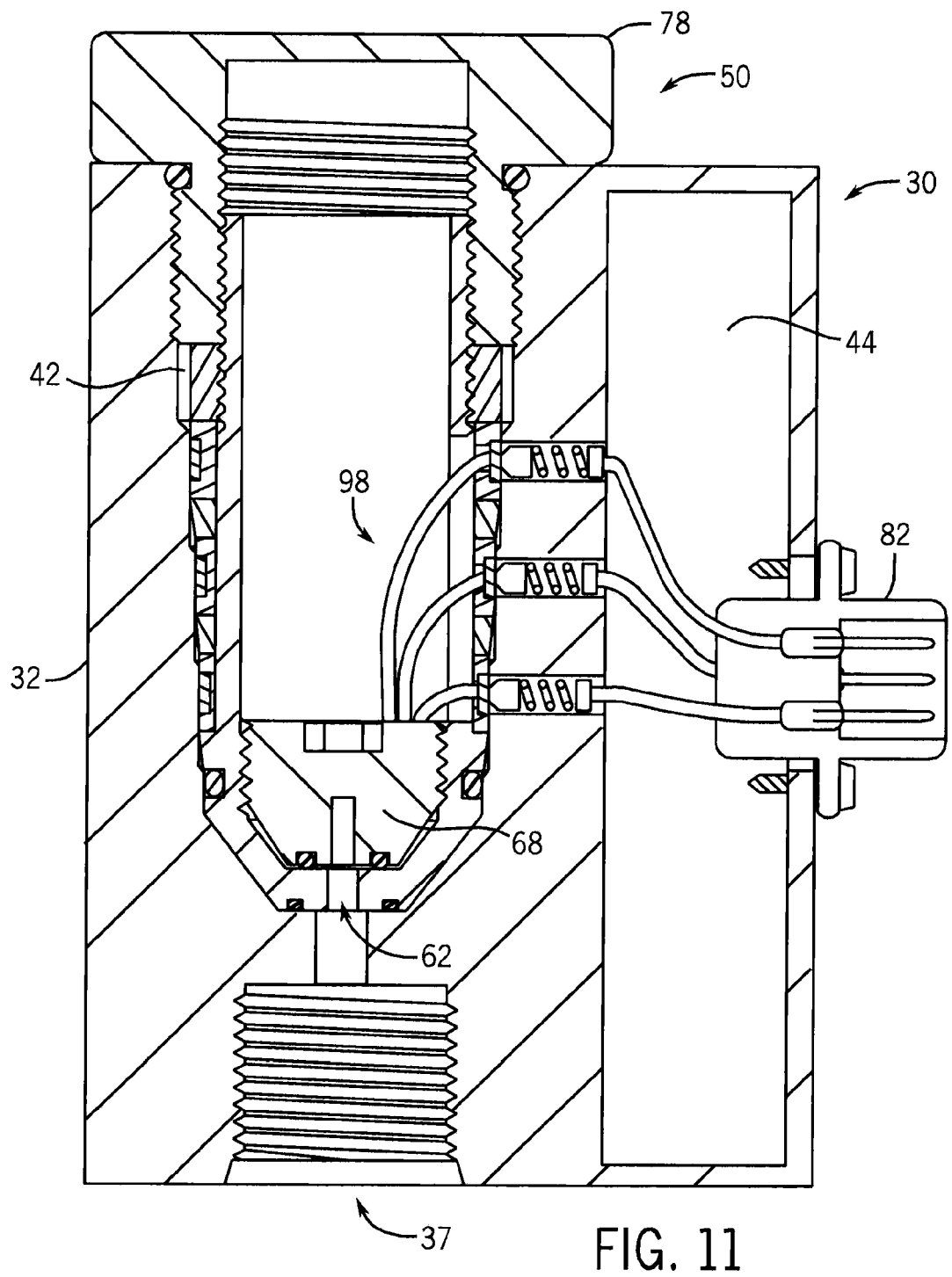
FIG. 11 is a cross-section illustration of an exemplary embodiment of a fluid system component defining a single fluid port, the component further defining a transducer orifice configured to receive a fluid transducer, with a sensor in the fluid transducer configured to couple directly with a data port coupled to the fluid system component.

In another embodiment, as illustrated in FIG. 7, the sensor 68 of the fluid transducer 50 is coupled to the data port 82 through the electric module 98 and wiring passing through the electronic module cavity 44. In such circumstance, a controller or other data powered device is coupled to the data port 82 external to the fluid system component 30.

Referring now to FIGS. 8-11, the fluid system component 30 defines a single fluid port 37 which is in fluid communication with the through bore defined in the transducer housing 52 of the cartridge fluid transducer 50.

Several types of electrical and physical connections of the fluid transducer 50 in the body 32 of the fluid system component 30 as described with respect to FIGS. 4-7 are similarly applicable to the single port fluid system component 30 illustrated in FIGS. 8-11.

In each of the multi-port and single port fluid system component 30 as illustrate in FIGS. 4-11, the fluid transducer 50 is used to measure a characteristic of a fluid in the fluid system 20. The fluid system 20 includes a fluid component 30 coupled to the fluid system 20. In operation, an operator would install the cartridge fluid transducer 50 into the transducer orifice 42 defined in the component body 32 of the fluid system component 30. Because of the annular conductor-insulator assemblies 84, 88 on the transducer housing 52 a specific or keyed orientation of the fluid transducer 50 is not required. Further, because of the different outside diameter configurations relative to each of the conductor-insulator assemblies specific electrical contacts for power and data can be maintained in the fluid system component.

With the fluid transducer 50 installed in the fluid system component 30 only the cap 78 is exposed outside of the component body 32. Therefore, the sensor and electronics associated with the fluid transducer 50 is not exposed to environmental conditions to which the fluid system component 30 is subject. In other words, the fluid transducer 50 would not be damaged by chemicals, moisture or physical abuse to which conventional transducers typically are exposed. Such configuration as disclosed herein provided mechanical ruggedness as well as environmental ruggedness. The transducer 50 is also electrically rugged since the transducer has significantly high noise immunity because it is located within the metallic body of the fluid system component 30. Accordingly, transmissions such as radio frequency interference through the component body 32 is virtually eliminated.

If the transducer 50 experiences a malfunction of any sort, it can easily be replaced by simply unthreading it from the component body 32 and replacing it with an appropriate substitute. It is not necessary to replace the entire fluid system component 30 nor rewire the transducer to the data port since the alignment of the various electrical contacts 49 is maintained by the orientation of the conductor-insulator assemblies 84, 88, etc. Further, the various sealing components associated with the fluid transducer 50 maintain the hydraulic integrity of the fluid system component 30 while providing for appropriate fluid communication of the fluid transducer 50 in the fluid system 20.

Signals to and from the fluid transducer 50 are transmitted through the data port 82 either located in the cap 78 of the fluid transducer 50 or defined in or coupled to the component body 32. Such configuration and capability allows the fluid transducer 50 and its components to be reconfigured as necessary and/or to provide appropriate control signals to external devices.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of a cartridge fluid transducer has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the fluid transducer and fluid component as described herein may be made, none of which depart from the spirit or scope of the present disclosure. The particular embodiments and applications were chosen and described to provide the best illustration of the principles of the disclosure and its practical application to thereby enable one of ordinary skill in the art to utilize the fluid transducer in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A fluid transducer comprising:
 a transducer housing defining an interior cavity, the transducer housing including a nose section, a middle section, and a rear section, with the nose section defining a through bore;

a sensor disposed in the nose section and in fluid communication with the through bore;

an electronic module disposed in the middle section and in electric communication with the sensor;

a cap coupled to the rear section of the transducer housing, with the cap configured to seal the rear section of the transducer housing; and a conductor-insulator assembly coupled to an outer surface of the transducer housing and the conductor coupled to the electronic module.

2. The fluid transducer of claim 1 including a second conductor-insulator assembly coupled to the outer surface of the transducer housing a spaced distance from the other conductor, with the second conductor-insulator assembly coupled to the electronic module.

3. The fluid transducer of claim 1 including a retainer nut coupled to the transducer housing and configured to axially secure the conductor-insulator assembly to the transducer housing.

4. The fluid transducer of claim 1 including a spring disposed in the cavity between the cap and electronic module, the spring configured to bias the electronic module toward the sensor.

5. The fluid transducer of claim 1 wherein the transducer housing is configured with the outer surface tapered at the nose section.

6. The fluid transducer of claim 5 wherein the conductor-insulator assembly is annular in shape, with an inside diameter corresponding to the outer surface of the transducer housing.

7. The fluid transducer of claim 6 wherein the outer diameter of the second conductor-insulator assembly is less than the outer diameter of the first conductor-insulator assembly.

8. The fluid transducer of claim 1 including a data port defined in the cap, with the data port in electric communication with the electronic module, wherein data is transmitted to and from the electronic module and wherein the electronic module is reconfigurable through the data port.

9. The fluid transducer of claim 1 wherein the sensor is configured to sense pressure.

10. The fluid transducer of claim 1 wherein the sensor is a strain gauge.

11. The fluid transducer of claim 1 wherein the insulator of the conductor-insulator assembly is configured to insulate the conductor electrically from the transducer housing.

12. The fluid transducer of claim 1 wherein the electronic module is an analog amplifier.

13. A fluid system component comprising:

a component body including an inlet port and an outlet port, with the component body defining a conduit between the inlet and outlet ports;

a transducer orifice defined in the component body and in fluid communication with the conduit; and a fluid transducer configured for installation in the transducer orifice, with the fluid transducer comprising:

a transducer housing defining an interior cavity, the transducer housing including a nose section, a middle section, and a rear section, with the nose section defining a through bore;

a sensor disposed in the nose section and in fluid communication with the through bore;

an electronic module disposed in the middle section and in electric communication with the sensor;

a cap coupled to the rear section of the transducer housing, with the cap configured to seal the rear section of the transducer housing; and a conductor-insulator assembly coupled to an outer surface of the transducer housing and coupled to the electronic module, wherein the through bore is in fluid communication with the transducer orifice, and only the cap is exposed outside of the component body.

14. The fluid system component of claim 13 including a second conductor-insulator assembly coupled to the outer surface of the transducer housing a spaced distance from the other conductor-insulator assembly, with the second conductor-insulator assembly coupled to the electronic module.

15. The fluid system component of claim 13 including a data port defined in the cap, with the data port in electric communication with the electronic module, wherein data is transmitted to and from the electronic module and wherein the electronic module is reconfigurable through the data port.

16. The fluid system component of claim 13 including a retainer nut coupled to the transducer housing and configured to axially secure the conductor-insulator assembly to the transducer housing.

17. The fluid system component of claim 13 including a spring disposed in the cavity between the cap and electronic module, the spring configured to bias the electronic module toward the sensor.

18. The fluid system component of claim 13 wherein the transducer housing is configured with the outer surface tapered at the nose section.

19. The fluid system component of claim 18 wherein the conductor-insulator assembly is annular in shape, with an inside diameter corresponding to the outer surface of the transducer housing.

20. The fluid system component of claim 19 wherein the outer diameter of the second conductor-insulator assembly is less than the outer diameter of the conductor-insulator assembly.

21. The fluid system component of claim 13 wherein the sensor is configured to sense pressure.

22. The fluid system component of claim 13 wherein the sensor is a strain gauge.

23. The fluid system component of claim 13 wherein the insulator of the conductor-insulator assembly is configured to insulate the conductor electrically from the transducer housing.

24. The fluid system component of claim 13 wherein the electronic module is an analog amplifier.

25. A fluid system component comprising:

a component body including an inlet port and an outlet port, with the component body defining a conduit between the inlet and outlet ports;

a transducer orifice defined in the component body and in fluid communication with the conduit; and a fluid transducer configured for installation in the transducer orifice, with the fluid transducer comprising:

a transducer housing defining an interior cavity, the transducer housing including a nose section, a middle section, and a rear section, with the nose section defining a through bore;

a sensor disposed in the nose section and in fluid communication with the through bore;

an electric module disposed in the middle section and in electric communication with the sensor;

a cap coupled to the rear section of the transducer housing, with the cap configured to seal the rear section of the transducer housing; and a conductor-insulator assembly coupled to an outer surface of the transducer housing and coupled to the electric module;
an electronic module cavity defined in the component body, including a raceway in communication with the transducer orifice; and
a component electronic module disposed in the electronic module cavity and coupled to the conductor-insulator assembly with a conductor through the raceway, wherein the through bore is in fluid communication with the transducer orifice, and only the cap is exposed outside of the component body.

26. The fluid system component of claim 25 including a second conductor-insulator assembly coupled to the outer surface of the transducer housing a spaced distance from the other conductor-insulator assembly, with the second conductor-insulator assembly coupled to the component electronic module.

27. The fluid system component of claim 25 including a data port defined in the component body, with the data port in electric communication with the electronic module, wherein data is transmitted to and from the electronic module and wherein the electronic module is reconfigurable through the data port.

28. The fluid system component of claim 25 including a retainer nut coupled to the transducer housing and configured to axially secure the conductor-insulator assembly to the transducer housing.

29. The fluid system component of claim 25 including a spring disposed between the cap and electric module, the spring configured to bias the electric module toward the sensor.

30. The fluid system component of claim 25 wherein the transducer housing is configured with the outer surface tapered at the nose section.

31. The fluid system component of claim 30 wherein the conductor-insulator assembly is annular in shape, with an inside diameter corresponding to the outer surface of the transducer housing.

32. The fluid system component of claim 31 wherein the outer diameter of the second conductor-insulator assembly is less than the outer diameter of the first conductor-insulator assembly.

33. The fluid system component of claim 25 wherein the sensor is configured to sense pressure.

34. The fluid system component of claim 25 wherein the sensor is a strain gauge.

35. The fluid system component of claim 25 wherein the insulator of the conductor-insulator assembly is configured to insulate the annular conductor of the conductor-insulator assembly electrically from the transducer housing.

36. The fluid system component of claim 25 wherein the component electronic module is an analog amplifier.

37. A method to measure a characteristic of a fluid in a fluid system, the fluid system including a fluid component defining a port configured to couple to the fluid system, and further defining an orifice in the fluid component with the orifice in fluid communication with the port, the method comprising:
providing a fluid transducer configured for installation in the orifice, with the fluid transducer comprising:
a transducer housing defining an interior cavity, the transducer housing including a nose section, a middle section, and a rear section, with the nose section defining a through bore;
a sensor disposed in the nose section and in fluid communication with the through bore;
an electronic module disposed in the middle section and in electric communication with the sensor;
a cap coupled to the rear section of the transducer housing, with the cap configured to seal the rear section of the transducer housing; and
a conductor-insulator assembly coupled to an outer surface of the transducer housing and coupled to the electric module, wherein the through bore is in fluid communication with the orifice;
installing the fluid transducer in the orifice, wherein only the cap is exposed outside of the fluid component and wherein the fluid transducer is in fluid communication with the fluid through the through bore;
coupling the fluid transducer to a controller;
obtaining a signal from the sensor configured to provide a preselected characteristic of the fluid; and
transmitting the signal to the controller, wherein the characteristic of the fluid is manifested.

38. The method of claim 37 including the step of configuring the sensor to sense one of fluid pressure and fluid temperature.

39. The method of claim 37 wherein a second conductor-insulator assembly is provided and coupled to the outer surface of the transducer housing a spaced distance from the other conductor-insulator assembly, with the second conductor-insulator assembly coupled to the electric module.

40. The method of claim 37 wherein the conductor-insulator assembly is annular in shape, with an inside diameter corresponding to the outer surface of the transducer housing.

41. The method of claim 37 including the steps of providing a data port defined in the cap, coupling the data port to the electronic module for electrical communication, transmitting data to and from the electronic module and the controller.

42. The method of claim 37 including the step of reconfiguring the electronic module through the data port.

43. The method of claim 37 wherein the electric module is an analog amplifier.

44. The method of claim 37 wherein the controller is a computer.

45. A fluid system component comprising:
a component body defining a transducer orifice and a single fluid port, with the transducer orifice in fluid communication with the single fluid port; and
a fluid transducer configured for installation in the transducer orifice, with the fluid transducer comprising:
a transducer housing defining an interior cavity, the transducer housing including a nose section, a middle section, and a rear section, with the nose section defining a through bore;
a sensor disposed in the nose section and in fluid communication with the through bore;
an electronic module disposed in the middle section and in electric communication with the sensor;
a cap coupled to the rear section of the transducer housing, with the cap configured to seal the rear section of the transducer housing; and
a conductor-insulator assembly coupled to an outer surface of the transducer housing and coupled to the electronic module, wherein the through bore is in fluid communication with the transducer orifice, and only the cap is exposed outside of the component body.

46. The fluid system component of claim 45 including a second conductor-insulator assembly coupled to the outer surface of the transducer housing a spaced distance from the other conductor-insulator assembly, with the second conductor-insulator assembly coupled to the electronic module.

47. The fluid system component of claim 45 including a data port defined in the cap, with the data port in electric communication with the electronic module, wherein data is transmitted to and from the electronic module and wherein the electronic module is reconfigurable through the data port.

48. The fluid system component of claim 45 wherein the transducer housing is configured with the outer surface tapered at the nose section.

49. The fluid system component of claim 48 wherein the conductor-insulator assembly is annular in shape, with an inside diameter corresponding to the outer surface of the transducer housing.

50. The fluid system component of claim 49 wherein the outer diameter of the second conductor-insulator assembly is less than the outer diameter of the annular conductor-insulator assembly.

* * * * *